UNITED STATES PATENT OFFICE.

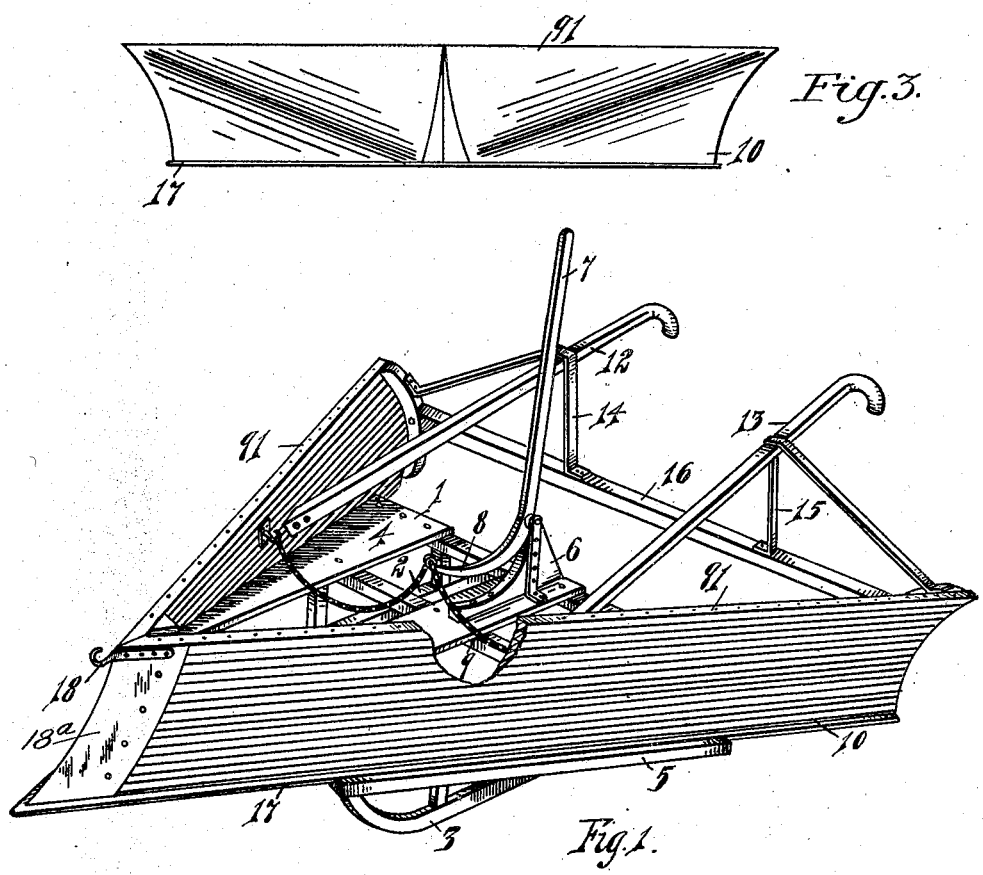

GEORGE C. MOORE, OF DETROIT, MICHIGAN.

SNOW-PLOW.

No. 814,977.        Specification of Letters Patent.        Patented March 13, 1906.

Application filed May 18, 1905. Serial No. 260,959.

*To all whom it may concern:*

Be it known that I, GEORGE C. MOORE, a citizen of the United States, residing at Detroit, county of Wayne, State of Michigan, have invented a certain new and useful Improvement in Snow-Plows; and I declare the following to be a full, clear, and exact description of the invention, such as will enable others skilled in the art to which it pertains to make and use the same, reference being had to the accompanying drawings, which form a part of this specification.

This invention relates to snow-plows. It has for its object an improved snow-plow and vehicle for the transportation thereof.

In the drawings, Figure 1 shows the device in perspective. Fig. 2 shows the detail of construction. Fig. 3 is a front elevation of the moldboards of the plow.

1 indicates the vehicle for the transportation of the device, which consists of a sled with runners 2 and 3 and with platforms 4, on which the snow-plow proper rests when the snow-plow is being transported. The platforms 4 widen from front to rear and are provided with cleats 5, which form raised borders behind which the moldboards of the plow engage, resting at the same time upon the platforms 4.

From the body of the sled rises a standard 6, to which is pivotally connected a bent lever 7, the lower and front end of which 8 carries a chain 9, that extends to each side of the lever and engages the plow on the inside of the moldboard.

The plow itself is triangular in shape, pointed in front and broadening at the rear, with the sides or moldboards thereof standing nearly vertical at the meeting-line at the front and curved or warped to cause the upper edge 9' of each side to overhang the lower edge 10 and giving to the plow the turning effect of a warped moldboard.

The plow is provided with handles 12 and 13, suitably secured to the inside of the moldboards and braced by braces 14 and 15 over a cross-bar 16. Each moldboard of the plow is shod with a shoe 17, which projects at the point beyond the lower edges of the more vertical parts of the moldboards. The meeting edges of the two moldboards are protected at the front end with a covering 18ª. The structure is drawn by an attachment secured to the front end at the upper side by means of a chain or links 18. The projecting points of the shoe serve to hold the plow down when in operation.

In operation the plow is lifted, by means of the lever 7, until it rises above the cleats 5 and is allowed to be drawn slightly forward by the horse or other drawing power and then lowered to the surface of the ground or the surface from which the snow is to be cleaned. The plow is then drawn forward, cutting through the snow and spreading it and turning the packed or more compressed part at the rear of the plow upward and outward, causing the plow to move easily forward in a straight line and to be easily held from swinging. During this period of operation the sled is drawn forward between the wings of the plow and is always in a position for reloading whenever it is desired to reload. To effect the reloading, the lever 7 is swung, lifting the plow until the bottom of it rises above the cleats 5, and it is then drawn backward by the operator until it rests on the table 4 behind the cleats. In constructing the sides of the plow I use narrow strips nailed one to another, with a layer of white lead between the strips. The nails used are long enough to pass through three strips, and thus the nails secure the strips very securely together, making a web of wire nails as a vertical holding means.

What I claim is—

1. In combination, a carrying-sled and a snow-plow carried thereby, the said snow-plow having a forward terminal central to the sled and moldboards diverging to each side from the center line of said sled, a lever pivoted to the sled and having connections to the plow whereby the plow may be shipped and unshipped from the sled, substantially as described.

2. In combination, a sled provided with platforms widening from front to rear and furnished with cleats, a triangular snow-plow adapted to rest on the platforms of said sled and engage behind said cleats, a lever pivoted to the sled and having connections to the plow and adapted to actuate the plow to ship and unship the same from said sled, substantially as described.

3. In a snow-plow, in combination, moldboards meeting at a pointed front terminal and having sides diverging from said meeting-point and warping from the front toward the rear with the upper edges thereof overhanging the lower edges at the rear and with a shoe secured to said moldboards and projecting beyond the meeting edges at the point, substantially as described.

4. In a snow-plow, the combination of a carrying-vehicle, platforms to said vehicle provided with cleats, a triangular-shaped snow-plow adapted to rest on said platforms behind said cleats, means for lifting the plow with respect to the vehicle, substantially as described.

In testimony whereof I sign this specification in the presence of two witnesses.

GEORGE C. MOORE.

Witnesses:
CHARLES F. BURTON,
MAY E. KOTT.